(12) United States Patent
Mittal et al.

(10) Patent No.: US 11,200,606 B2
(45) Date of Patent: Dec. 14, 2021

(54) SYSTEM AND METHOD FOR FACILITATING PURCHASE OF PRODUCTS FROM DIFFERENT MERCHANTS

(71) Applicant: Mastercard International Incorporated, Purchase, NY (US)

(72) Inventors: Shreya Mittal, New Delhi (IN); Nishant Maheshwari, Aligarh (IN); Navneet Kumar, Benares (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 138 days.

(21) Appl. No.: 16/128,319

(22) Filed: Sep. 11, 2018

(65) Prior Publication Data

US 2019/0080376 A1    Mar. 14, 2019

(30) Foreign Application Priority Data

Sep. 13, 2017   (SG) .......................... 10201707492W

(51) Int. Cl.
*G06Q 30/06*    (2012.01)
*G06Q 20/22*    (2012.01)
*G06Q 20/12*    (2012.01)
*G06Q 20/32*    (2012.01)

(52) U.S. Cl.
CPC ......... *G06Q 30/0601* (2013.01); *G06Q 20/12* (2013.01); *G06Q 20/22* (2013.01); *G06Q 20/322* (2013.01)

(58) Field of Classification Search
CPC ..... G06Q 30/0601–0645; G06Q 30/80; G06Q 30/06–08

USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2

See application file for complete search history.

(56) References Cited

U.S. PATENT DOCUMENTS

| 7,197,475 | B1 * | 3/2007 | Lorenzen ............... G06Q 30/02 235/383 |
| 2008/0046338 | A1 * | 2/2008 | Tarvydas ........... G06Q 30/0625 705/26.81 |

(Continued)

*Primary Examiner* — Ming Shui

(57) ABSTRACT

System and method for facilitating purchase of products from a plurality of different merchants. The system includes a payment processor module that is in communication with a first e-commerce platform associated with a first merchant and a second e-commerce platform associated with a second merchant. The payment processor module is configured to receive data comprising: first product information relating to a first product to be purchased by a customer through the first e-commerce platform; and second product information relating to a second product to be purchased by the customer through the second e-commerce platform. The data is received in real-time without delay after the customer provides an indication of intent to purchase the first and the second products. The payment processor module is further configured to initiate a single transaction based on the data that is received, wherein the single transaction corresponds to the purchase of the first and the second products by the customer.

20 Claims, 5 Drawing Sheets

(56) References Cited

U.S. PATENT DOCUMENTS

2015/0120508 A1\* 4/2015 Black ................. G06Q 30/0635
                                                        705/26.81
2017/0063840 A1\* 3/2017 Krishnaiah ........ G06Q 20/3674

\* cited by examiner

SYSTEM AND METHOD FOR FACILITATING PURCHASE OF PRODUCTS FROM DIFFERENT MERCHANTS

CROSS REFERENCE TO RELATED APPLICATIONS

This application claims priority to Singapore Application Serial No. 10201707492W, filed Sep. 13, 2017, which is incorporated herein by reference in its entirety

FIELD OF INVENTION

The present invention relates broadly, but not exclusively, to systems and methods for facilitating purchase of products from different merchants.

BACKGROUND

When a customer wishes to purchase a product, it is natural for him/her to shop around at different merchants to compare prices. In the context of online shopping, the customer will likely visit a few merchant websites to compare prices before making a purchase. In an event that a customer wishes to purchase two or more items from different merchants, the customer would need to make separate transactions at each of the merchant websites.

For example, a customer wants to purchase a keyboard, jeans and a pair of shoes. He/she visits a number of merchant websites to compare the prices of the three products and decides to pay the lowest price for each product. Suppose that the keyboard has the lowest price at Merchant A, the jeans has the lowest price at Merchant B and the shoes the lowest price at Merchant C. Currently, the customer will have to purchase these items by making three separate transactions at the websites of Merchant A, Merchant B, and Merchant C, respectively. Obviously, this is not an ideal consumer experience as time and effort is needed to make the three separate transactions. This situation is worse when there are many products to be purchased.

A need therefore exists to provide systems and methods for facilitating purchase of products that seek to address at least some of the above problems.

SUMMARY

According to a first aspect, there is provided a system for facilitating purchase of products from a plurality of different merchants, the system including a payment processor module that is communication with a first e-commerce platform associated with a first merchant and a second e-commerce platform associated with a second merchant, wherein the payment processor module is configured to: receive data including: first product information relating to a first product to be purchased by a customer through the first e-commerce platform; and second product information relating to a second product to be purchased by the customer through the second e-commerce platform, wherein the data is received in real-time without delay after the customer provides an indication of intent to purchase the first and the second products; and initiate a single transaction based on the data that is received, wherein the single transaction corresponds to the purchase of the first and the second products by the customer.

According to a second aspect, there is provided a method for facilitating purchase of products from a plurality of different merchants, including: receiving, at a payment processor module, data including: first product information relating to a first product to be purchased by a customer through a first e-commerce platform associated with a first merchant; first customer credentials associated with a customer account with the first merchant; second product information relating to a second product to be purchased by the customer through a second e-commerce platform associated with a second merchant; and second customer credentials associated with a customer account with the second merchant, wherein the data is received in real-time without delay after the customer provides an indication of intent to purchase the first and the second products; and initiating, at the payment processor module, a single transaction based on the data that is received, wherein the single transaction corresponds to the purchase of the first and the second products by the customer.

According to a third aspect, there is provided a method for facilitating purchase of products from a plurality of different merchants, including: transmitting data including: first product information relating to a first product to be purchased by a customer from a first e-commerce platform associated with a first merchant to a payment processor module; and second product information relating to a second product to be purchased by the customer from a second e-commerce platform associated with a second merchant to the payment processor module; wherein the data is transmitted in real-time without delay after the customer provides an indication of intent to purchase the first and the second products, and wherein a single transaction corresponding to the purchase of the first and the second products by the customer is initiated by the payment processor module based on the transmitted data.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Figure 1:
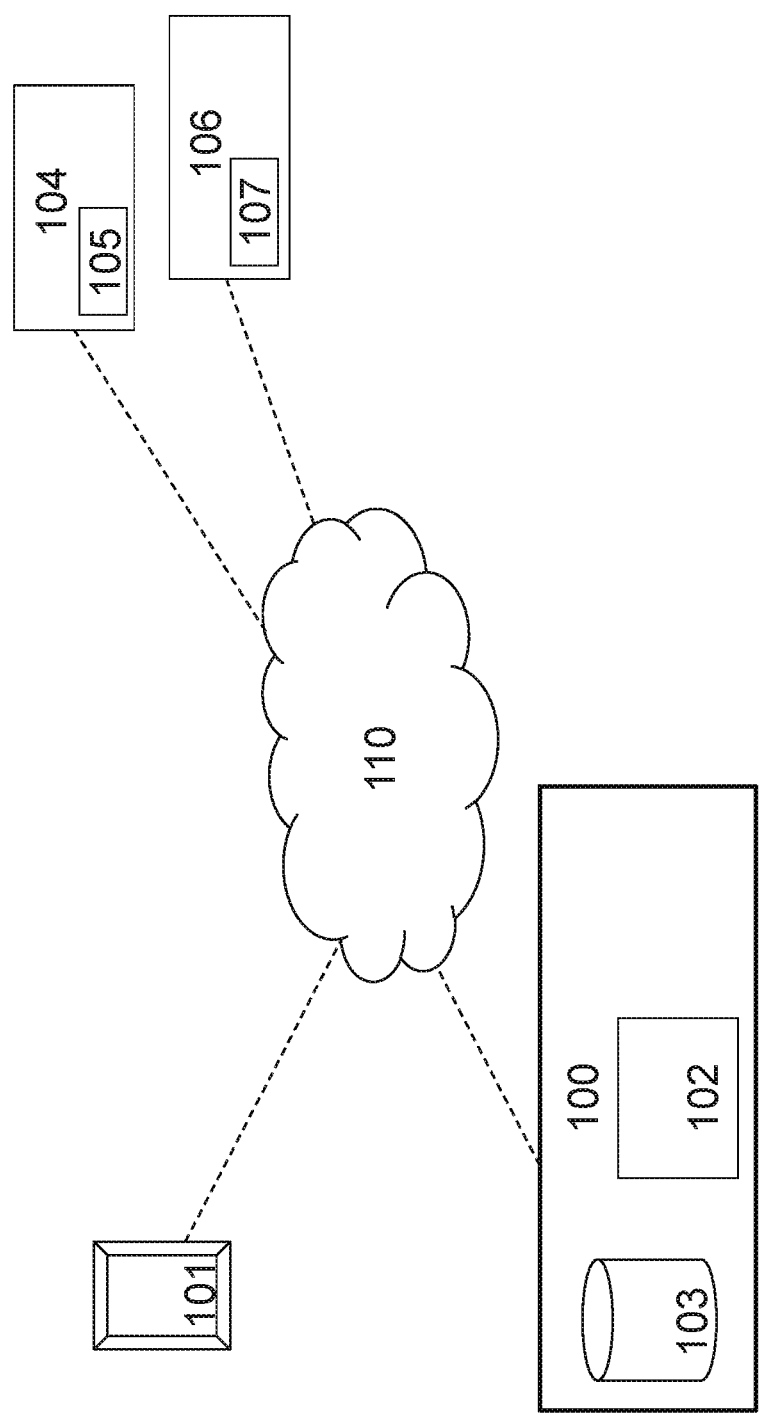
FIG. 1 shows a schematic of a system for facilitating purchase of products from different merchants, according to an example embodiment.

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

In the following description, "e-commerce platform" refers to hardware and/or software modules that facilitate e-commerce, i.e. buying and selling of goods and services or transmitting of funds or data over an electronic network, primarily the Internet. An example of a software module is a mobile application that can be downloaded and installed on a consumer's mobile device. The consumer can use the mobile application to select one or more products for purchase.

In the following description, the term "module" can refer to software, a hardware element, or a combination of both.

In the following description, a "digital wallet" refers to software and/or hardware elements that allow a consumer to make electronic transactions. This can include purchasing items using a mobile device (e.g. smartphone) with a digital wallet application installed thereon. The consumer's bank account can be linked to the digital wallet. Typically, digital wallets are stored on the consumer side and are compatible with most e-commerce websites.

An Application Programming Interface (API) enables software and applications to communicate with each other. It is a software-to-software interface that allows for separate parties to communicate with each other without any previous user knowledge or intervention. In general terms, it is a set of clearly defined methods of communication between various software components.

Embodiments relate to systems and methods for facilitating purchase of products from different merchants. In particular, embodiments enable customers to purchase multiple products from different online merchants based on a single consolidated transaction. The customer would not need to make separate transactions at each of the merchant websites in order to purchase the multiple products. In this manner, online shopping becomes hassle free for customers in terms of payments.

In an exemplary embodiment, real time Application Programming Interface (API) integration is used to merge different payments to be made on different online platforms into a single final consolidated payment transaction that can be made using a digital wallet (such Masterpass™ by MasterCard®) or through a separate mobile payment application. In this manner, a customer can add their choice of products from multiple e-commerce websites and make a single final payment through the digital wallet or through the separate mobile payment application.

The digital wallet or the separate mobile payment application is linked to the different user accounts of the customer with the various online merchants. For example, the digital wallet or the separate mobile payment application can be fed with the user ID and/or credentials associated with the respective user accounts and securely stored therein. The received payment is subsequently distributed to the different merchants. Advantageously, embodiments can significantly reduce the transaction time and enhance consumer experience.

In an example scenario, a user initially opens his digital wallet application to link merchants to the application. The application's user interface shows a list of merchants that have agreed to be linked with the application (i.e. "onboarded").

The user selects a merchant, Merchant A, and logs on to Merchant A's website using the application. The application is able to detect the user's ID associated with Merchant A and securely saves the ID. The user does the same for other merchants. This is just a one-time authentication and registration process with each of the merchants. The application's user interface can have a "Linked Merchants" section that displays all the merchants have been successfully linked.

Subsequently, the user can access the various merchants' e-commerce websites as they do normally (e.g. via a web browser, and not via the digital wallet application). The user can add the products he intends to purchase in the virtual shopping cart of the various merchants. In this case, the user adds in a keyboard ($25) from Merchant A, jeans ($20) from Merchant B and shoes ($50) from Merchant C. These items are in the respective virtual shopping carts of the merchants.

The user now opens his digital wallet application. The "Linked Merchants" section can show the respective virtual shopping carts for the different merchants. The data of the respective virtual shopping carts can be updated through real time API integration within the merchants and the digital wallet application or a payment portal.

Through the user interface of the application, the user can see the various items selected from the different sites with their respective prices. A checkbox can be provided against each item so that the user can un-check the items he does not wish to purchase and this is highlighted in the final amount to be paid.

Through real time API integration, the digital wallet application or payment portal then communicates with the respective servers or e-commerce platforms of the various merchants and confirms the receipt of payment of the various products at a product level.

In this case, the total amount is $25+$20+$50 i.e. $95 in all. The user pays $95 and the same is disbursed to Merchants A, B and C accordingly. Optionally, an administrative fee can be levied such that an administrator of the digital wallet application or payment portal charges a percentage of the paid amount or a fixed amount for facilitating this consolidated purchase. When the user makes the payment, he/she gets a notification that he has paid $95 and each of the merchants get a notification that the amount for specific goods added in the cart has been paid by the user. For example, the digital wallet application provides an indication to Merchant A's e-commerce platform that payment of $25 has been made for the keyboard.

Assuming that all the merchants already have the shipping details of the user saved on their platform, delivery of the purchased items can be effected. The user can receive a final message from the respective e-commerce platforms that the payment has been received, the order has been placed and purchased items will be delivered in due course.

FIG. 1 shows a schematic of a system 100 for facilitating purchase of products from a plurality of different merchants, according to an example embodiment. The system 100 includes a payment processor module 102 that is communication with a first e-commerce platform 104 associated with a first merchant and a second e-commerce platform 106 associated with a second merchant. The system 100 can be connected to the first e-commerce platform 104 and the second e-commerce platform 106 via known communication channels/networks 110, e.g. 4G mobile telecommunications technology. For conciseness, the system 100 is described with two different merchants, i.e. the first merchant and the second merchant. A skilled reader will readily appreciate that the system 100 can be easily extended to accommodate more than two merchants, i.e. a third merchant, a fourth merchant, etc. Exemplary hardware components of the system 100 and payment processor module 102 will be described in more detail below with reference to FIG. 3.

The payment processor module 102 is configured to receive data that includes (i) first product information relating to a first product to be purchased by a customer through the first e-commerce platform 104, and (ii) second product information relating to a second product to be purchased by the customer through the second e-commerce platform 106. The data can further include (iii) first customer credentials associated with a customer account with the first merchant, and (iv) second customer credentials associated with a customer account with the second merchant. The data is received in real-time without delay after the customer provides an indication of intent to purchase the first and the second products. The customer can use a mobile device 101 that is connected to the e-commerce platforms 104/106 via network 110 to provide the indications of intent to purchase the products.

The payment processor module 102 is further configured to initiate a single transaction based on the data that is received. The single transaction corresponds to the purchase of the first and the second products by the customer.

In order for the data to be received at the payment processor module 102 from the respective e-commerce platforms 104/106 in real-time without delay after the customer provides the indication of intent to purchase the first and the second products, functions of the first e-commerce platform 104 are exposed via a first application programming interface (API), functions of the second e-commerce platform 106 are exposed via a second API, and functions of the payment processor module 102 are exposed via a payment API.

The payment processor module 102 is further configured to generate a first and a second product release message on a condition that a payment corresponding to the single transaction is made by the customer. Each product release message may comprise an instruction to a merchant server or a payment gateway module associated with the e-commerce platform 104/106 to release and/or deliver the product to the consumer. In an implementation, the payment corresponding to the single transaction can be made by the customer using a digital wallet application that is running on the mobile device 101. The customer can open the digital wallet application which displays all the products that the customer wishes to purchase. Alternatively or in addition, a "pay" button may be displayed on a merchant website associated with the respective e-commerce platforms 104/106. When the customer wishes to pay for the products that he wishes to purchase, he clicks the button and the user is routed to the digital wallet application. In either case, the customer can use the digital wallet application to make payment by selecting one or more payment cards as known in the art. Once payment is made, the digital wallet application sends the product release messages to the respective merchants. The digital wallet application can generate separate transaction IDs for separate merchants which can then be sent against separate invoices. Transaction settlement and its related processes are performed as known in the art. Once the product release messages are received by the respective merchants, the order is processed and relevant transaction details are recorded by the merchants.

The first e-commerce platform 104 can be configured to send a first API request to the payment processor module 102. The first API request includes the indication of intent to purchase the first product and/or the first product information. Likewise, the second e-commerce platform 106 can be configured to send a second API request to the payment processor module 102. The second API request includes the indication of intent to purchase the second product and/or the second product information. In response to the first and second API requests, the payment processor module 102 is configured to send an API response to the respective e-commerce platforms 104/106. The API response includes at least the first and the second product release messages. In other words, the payment processor module 102 can be further configured to transmit the first and the second product release messages to the respective e-commerce platforms 104/106.

In an implementation, each e-commerce platform 104/106 can include a respective API request module 105/107. The API request modules 105/107 facilitate API requests to the payment processor module 102. For example, the API request modules 105/107 may provide a button either against each product or for all items in a virtual shopping cart. The button may be displayed on a merchant website associated with the respective e-commerce platforms 104/106. When the customer wishes to purchase a product or all products in the virtual shopping cart, he clicks the button and an API call/request to the payment processor module 102 is triggered. The address for the payment processor module 102 may be embedded in the button. The intent to purchase the products and/or the product information are/is sent to the payment processor module 102, optionally along with an invoice identifier or a transaction reference number for referencing purposes. Also, additional data such as customer credentials (more details on the additional data are provided below) can be sent to the payment processor module 102 so that the purchaser of the product(s) is known.

The first product information includes an identifier and a price of the first product; similarly the second product information comprises an identifier and a price of the second product. Accordingly, transaction data of the single transaction can include a total of the price of the first and the second products, such that the first and the second product release messages are generated on a condition that the payment made by the customer corresponds to the total of the price of the first and the second products.

In an implementation, the payment processor module 102 may be further configured to receive customer registration data. The customer registration data includes (i) first customer credentials associated with a customer account with the first merchant, and (ii) second customer credentials associated with a customer account with the second merchant. The payment processor module 102 may be further configured to enroll the first and the second customer credentials in association with a unique identifier of the customer. The unique identifier may be an account number or user identity of the digital wallet application.

The first and the second customer credentials can be a user ID or account number of the customer's account with the respective merchants. For example, the user ID of the customer's account with Merchant A is "John_A", the user ID of the customer's account with Merchant B is "John_B" and the account number of the digital wallet application is "001-12345-8". The payment processor module 102 is configured to enroll "John_A" and "John_B" in association with "001-12345-8". This data can be stored in a memory module 103 of the system 100, a stand-alone database (not shown in FIG. 1) and/or the customer's mobile device 101.

Additionally, the payment processor module 102 may be further configured to receive additional data. The additional data includes the first customer credentials and the second customer credentials. The additional data is received after the customer registration data has been received and enrolled at the payment processor module 102. The additional data is received in real-time without delay after the customer provides the indication of intent to purchase the first and the second products. The payment processor module 102 may be further configured to authenticate the received additional data based on the enrolled first and the second customer credentials. The single transaction corresponding to the purchase of the first and the second products can be initiated on a condition of successful authentication. Continuing from the example above, the received first customer credentials is "John_A" and the received second customer credentials is "John_B". Accordingly, the received first and second customer credentials are authenticated based on the enrolled first and the second customer credentials, for example by comparing whether there is a match between the received customer credentials (e.g. "John_A") and the previously enrolled customer credentials (e.g. "John_A"). If there is a match, authentication is successful and the single transaction can be initiated. Conversely, if there is no match, the transaction is not initiated and an authentication-failure message may be generated.

The payment processor module 102 may be further configured to determine the unique identifier that is associated with the first and the second customer credentials based on the received additional data. The transaction data of the single transaction can include the determined unique identifier in addition to the total of the price of the first and the second products. For example, if the received first and second customer credentials are "John_A" and "John_B", respectively, the payment processor module 102 can execute to look-up search to determine the associated unique identifier. In the earlier example, "John_A" and "John_B" are enrolled in association with "001-12345-8". Accordingly, based on a look-up search, the unique identifier "001-12345-8" associated with "John_A" and "John_B" is determined. By determining the unique identifier, it is possible to initiate and/or complete the transaction as the identity of the payee (i.e. the customer) and the transaction amount is known.

Figure 2A:
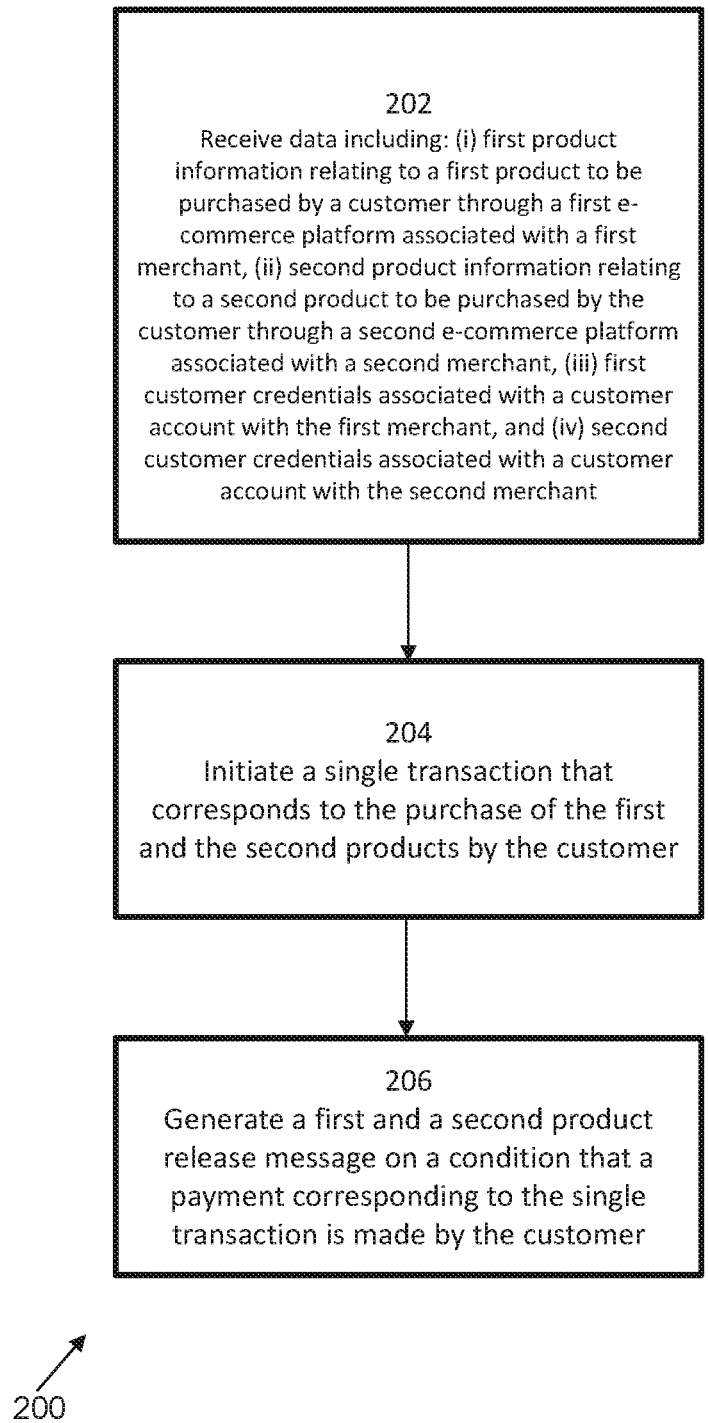
FIG. 2A shows a flow chart illustrating a method for facilitating purchase of products from different merchants, according to an example embodiment.

FIG. 2A shows a flow chart illustrating a method 200 for facilitating purchase of products from a plurality of different merchants, according to an example embodiment. For conciseness, the method 200 is described with two different merchants, i.e. the first merchant and the second merchant. A skilled reader will readily appreciate that the method 200 can be easily extended to accommodate more than two merchants, i.e. a third merchant, a fourth merchant, etc.

At step 202, data is received at a payment processor module. The data includes (i) first product information relating to a first product to be purchased by a customer through a first e-commerce platform associated with a first merchant, and (ii) second product information relating to a second product to be purchased by the customer through a second e-commerce platform associated with a second merchant. The data further includes (iii) first customer credentials associated with a customer account with the first merchant, and (iv) second customer credentials associated with a customer account with the second merchant. The data is received in real-time without delay after the customer provides an indication of intent to purchase the first and the second products.

At step 204, a single transaction is initiated at the payment processor module. The single transaction corresponds to the purchase of the first and the second products by the customer.

Prior to step 202, the method 200 further includes (i) exposing functions of the first e-commerce platform via a first application programming interface (API), (ii) exposing functions of the second e-commerce platform via a second API, and (iii) exposing functions of the payment processor module via a payment API. In this manner, the data can be received at the payment processor module from the respective e-commerce platforms in real-time without delay after the customer provides the indication of intent to purchase the first and the second products.

Subsequent to step 204, the method 200 further includes the step 206 of generating, at the payment processor module, a first and a second product release message on a condition that a payment corresponding to the single transaction is made by the customer.

In an implementation, the method 200 further includes sub-step (A) of sending a first API request from the first e-commerce platform to the payment processor module. The first API request includes the indication of intent to purchase the first product and/or the first product information. The method 200 also includes sub-step (B) of sending a second API request from the second e-commerce platform to the payment processor module. The second API request comprises the indication of intent to purchase the second product and/or the second product information. Subsequent to sub-steps (A) and (B), sub-step (C) involves sending an API response from the payment processor module to the respective e-commerce platforms. The API response includes the first and the second product release messages. In other words, the first and the second product release messages are transmitted from the payment processor module to the respective e-commerce platforms.

The first product information comprises an identifier and a price of the first product; similarly the second product information comprises an identifier and a price of the second product. In this manner, transaction data of the single transaction can include a total of the price of the first and the second products, such that the first and the second product release messages are generated (i.e. step 206 is executed) on a condition that the payment made by the customer corresponds to the total of the price of the first and the second products.

In an implementation, prior to step 202, the method 200 includes registration sub-step (I) of receiving customer registration data at the payment processor module. The customer registration data includes the first customer credentials associated with a customer account with the first merchant and the second customer credentials associated with a customer account with the second merchant. The method 200 further includes registration sub-step (II) of enrolling, at the payment processor module, the first and the second customer credentials in association with a unique identifier of the customer. The registration sub-steps (I) and (II) are preferably executed once to link the customer with the first and the second merchants. Thereafter, upon successful registration, steps 202 and 204 can be executed whenever the customer wishes to purchase products from the first and the second merchants.

Subsequent to the registration sub-step (I) of receiving the customer registration data, the method further includes receiving additional data at the payment processor module. The additional data includes the first customer credentials and the second customer credentials. The additional data is received in real-time without delay after the customer provides the indication of intent to purchase the first and the second products. In other words, the additional data is received at substantially the same time as the data (i.e. at step 202). Thereafter, the received additional data is authenticated at the payment processor module based on the enrolled first and the second customer credentials. The single transaction corresponding to the purchase of the first and the second products (i.e. step 204) is initiated on a condition of successful authentication.

Subsequent to the above described step of receiving the additional data, the method further comprises determining, at the payment processor module, the unique identifier that is associated with the first and the second customer credentials based on the received additional data. Transaction data of the single transaction may comprise the determined unique identifier. By determining the unique identifier, it is possible to initiate and/or complete the transaction as the identity of the payee (i.e. the customer) and the transaction amount is known.

Figure 2B:
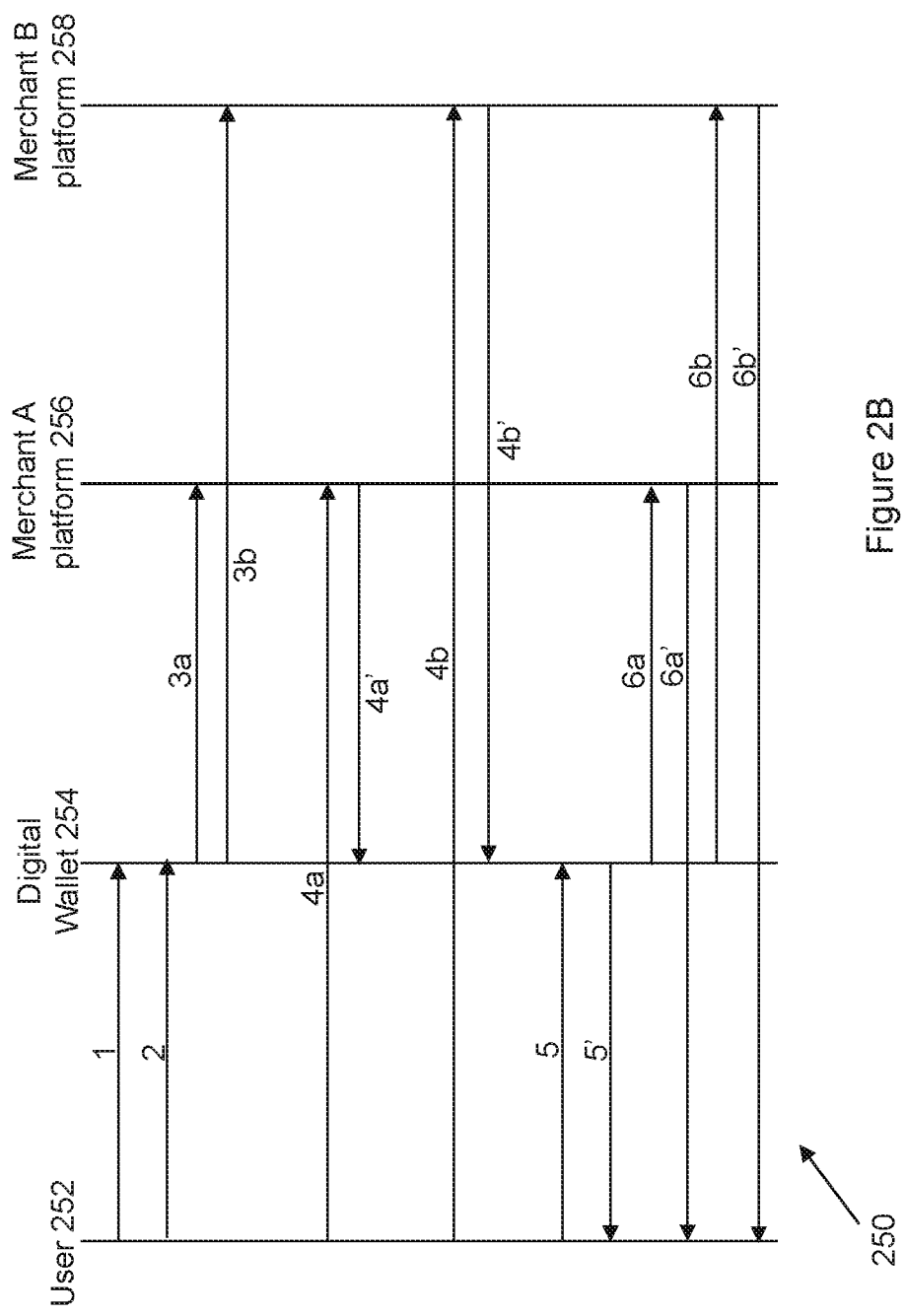
FIG. 2B shows a flow chart illustrating a method for facilitating purchase of products from different merchants, according to an example embodiment.

FIG. 2B shows a flow chart illustrating a method 250 for facilitating purchase of products from a plurality of different merchants, according to an example embodiment. At step 1, a user 252 opens his digital wallet application 254 with his login credentials. At step 2, the user 252 clicks on a "link merchants" button displayed on the digital wallet application's graphical user interface to link merchants to the application 254. The application's user interface shows a list of merchants that have agreed to be linked with the application (i.e. "on-boarded").

At step 3a, the user 252 selects a merchant, Merchant A, and logs on to Merchant A's e-commerce platform 256 using the application 254. The application 254 is able to detect the user's ID associated with Merchant A and securely saves the ID. The user 252 does the same for Merchant B. At step 3b, the user 252 selects Merchant B and logs on to Merchant B's e-commerce platform 258 using the application 254. The application 254 is able to detect the user's ID associated with Merchant B and securely saves the ID. In both cases, this is just a one-time authentication and registration process with each of Merchant A and B. The application's user interface can have a "Linked Merchants" section that displays all the merchants that have been successfully linked.

At step 4a, the user 252 can access Merchant A's e-commerce platform 256 as he/she does normally (e.g. via a web browser, and not via the digital wallet application 254). The user 252 can add the products he intends to purchase in the virtual shopping cart of Merchant A (e.g. a keyboard ($25) from Merchant A). Similarly at step 4b, the user 252 accesses Merchant B's e-commerce platform 258 and adds the products he intends to purchase in the virtual shopping cart of Merchant B (e.g. jeans ($20) from Merchant B).

The user 252 now opens his digital wallet application 254. The "Linked Merchants" section can show the respective virtual shopping carts for the different merchants. This is because at steps 4a' and 4b', the data of the respective virtual shopping carts are updated through real time API integration within the merchants and the digital wallet application 254.

At step 5, through the user interface of the application 254, the user 252 can see the various items selected with their respective prices. A checkbox can be provided against each item so that the user 252 can un-check the items he does not wish to purchase and this is highlighted in the final amount to be paid. In this case, the total amount is $25+$20 i.e. $45 in all. The user 252 pays $45 and the same is disbursed to Merchants A and B accordingly. After the user 252 makes the payment, at step 5', he/she gets a notification that he has paid $45.

At step 6a, through real time API integration, the digital wallet application 254 communicates with the e-commerce platform 256 of Merchant A and confirms the receipt of payment of the various products at a product level. For example, the digital wallet application 254 provides an indication to Merchant A's e-commerce platform 256 that payment of $25 has been made for the keyboard. Similarly, at step 6b, through real time API integration, the digital wallet application 254 communicates with the e-commerce platform 258 of Merchant B and confirms the receipt of payment of the various products at a product level.

Assuming that both Merchant A and B already have the shipping details of the user 252 saved on their platforms 256/258, delivery of the purchased items can be effected. At step 6a', the user 252 can receive a final message from the e-commerce platform 256 of Merchant A that the payment has been received, the order has been placed and purchased item(s) will be delivered in due course. Similarly, at step 6b', the user 252 can receive a final message from the e-commerce platform 258 of Merchant B that the payment has been received, the order has been placed and purchased item(s) will be delivered in due course.

Figure 2C:
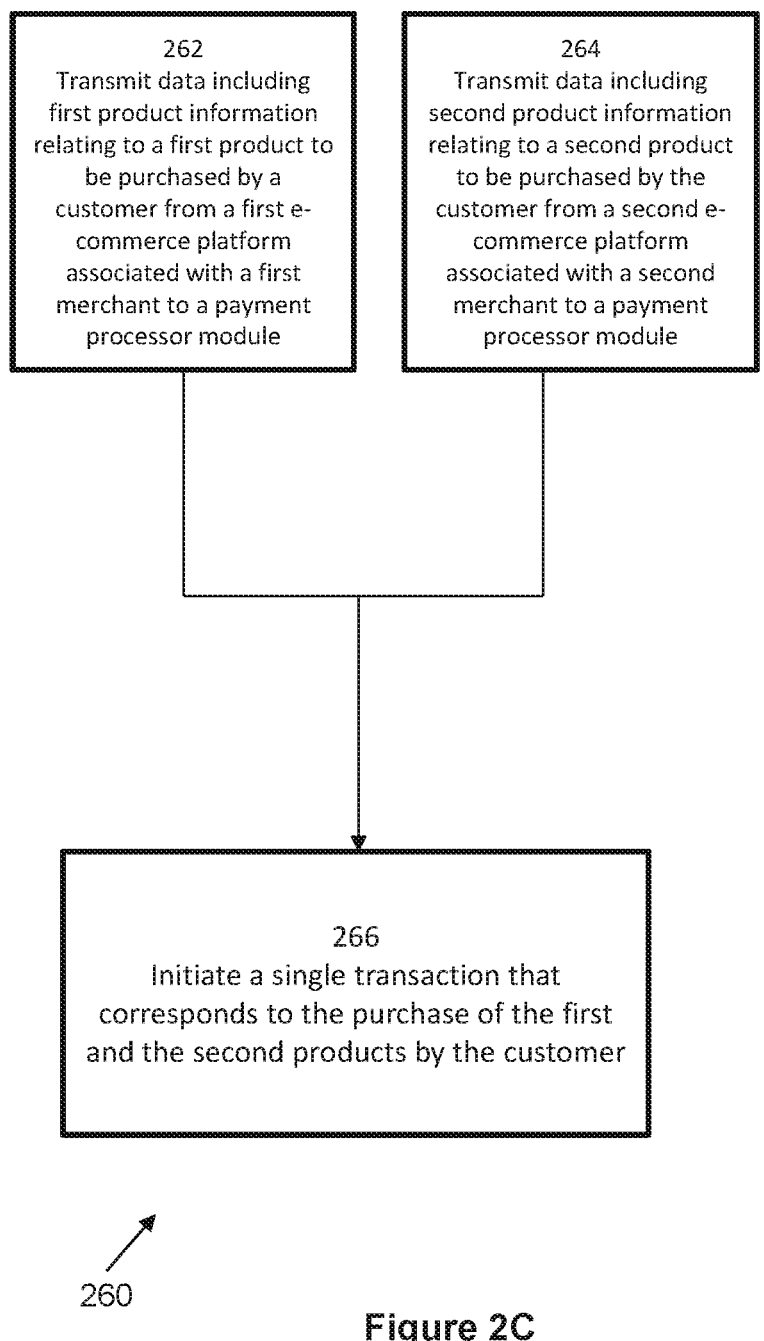
FIG. 2C shows a flow chart illustrating a method for facilitating purchase of products from different merchants, according to an example embodiment.

FIG. 2C shows a flow chart illustrating a method 260 for facilitating purchase of products from a plurality of different merchants, according to an example embodiment. For conciseness, the method 260 is described with two different merchants, i.e. the first merchant and the second merchant. A skilled reader will readily appreciate that the method 260 can be easily extended to accommodate more than two merchants, i.e. a third merchant, a fourth merchant, etc.

At step 262, data including first product information relating to a first product to be purchased by a customer is transmitted from a first e-commerce platform associated with a first merchant to a payment processor module. At step 264, data including second product information relating to a second product to be purchased by the customer is transmitted from a second e-commerce platform associated with a second merchant to the payment processor module. The data is transmitted in real-time without delay after the customer provides an indication of intent to purchase the first and the second products.

At step 266, a single transaction corresponding to the purchase of the first and the second products by the customer is initiated by the payment processor module based on the data that is transmitted.

In order for the above-mentioned data to be transmitted to the payment processor module from the respective e-commerce platforms in real-time without delay after the customer provides the indication of intent to purchase the first and the second products, the method may further include: exposing functions of the first e-commerce platform via a first application programming interface (API); exposing functions of the second e-commerce platform via a second API; and exposing functions of the payment processor module via a payment API.

By exposing the various functions of the e-commerce platforms and the payment processor module, it is possible to send a first API request from the first e-commerce platform to the payment processor module, wherein the first API request includes the indication of intent to purchase the first product and/or the first product information. It is also possible to send a second API request from the second e-commerce platform to the payment processor module, wherein the second API request includes the indication of intent to purchase the second product and/or the second product information. It is also possible to subsequently receive, from the payment processor module, an API response at the respective e-commerce platforms, wherein the API response includes a first and a second product release message.

The first product information includes an identifier and a price of the first product, and the second product information includes an identifier and a price of the second product.

Figure 3:
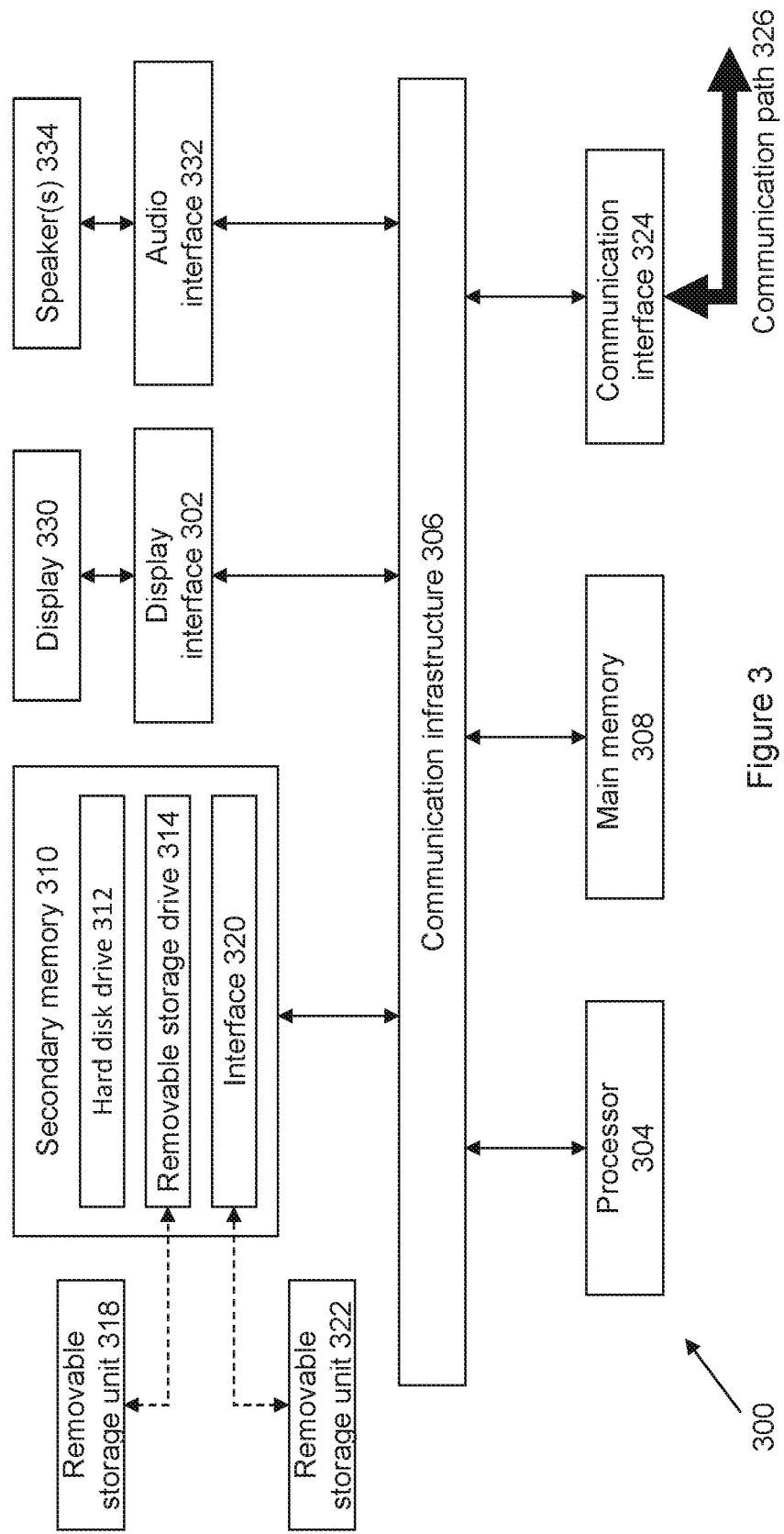
FIG. 3 shows a schematic diagram of a computer system suitable for use in executing one or more steps of the method for facilitating purchase of products from different merchants according to example embodiments.

FIG. 3 shows a schematic diagram of a computer device/system 300 suitable for use in executing one or more steps of the above-described methods for facilitating purchase of products from different merchants. One or more such computing devices 300 may be used to execute the above-described methods for facilitating purchase of products from different merchants. In addition, one or more components of the computer system 300 may be used to realize the system 100, payment processor module 102, and/or e-commerce platforms 104/106. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a hard disk drive 312 and/or a removable storage drive 314, which may include a magnetic tape drive, an optical disk drive, or the like. The removable storage drive 314 reads from and/or writes to a removable storage unit 318 in a well-known manner. The removable storage unit 318 may include a magnetic tape, optical disk, or the like, which is read by and written to by removable storage drive 314. As will be appreciated by persons skilled in the relevant art(s), the removable storage unit 318 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 320. Examples of a removable storage unit 322 and interface 320 include a program cartridge and cartridge interface (such as that found in video game console devices), a removable memory chip (such as an EPROM or PROM) and associated socket, and other removable storage units 322 and interfaces 320 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port, an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage unit 318, removable storage unit 322, a hard disk installed in hard disk drive 312, or a carrier wave carrying software over communication path 326 (wireless link or cable) to communication interface 324. Computer readable storage media refers to any non-transitory tangible storage medium that provides recorded instructions and/or data to the computing device 300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the hard disk drive 312, or the interface 320. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for facilitating purchase of products from a plurality of different merchants, the system comprising:
   at least one memory; and
   at least one payment processor, coupled to the at least one memory, that receives communications from a first online retail platform associated with a first merchant and from a second online retail platform associated with a second merchant, the at least one payment processor configured to:
   receive, from a user computing device of a customer, a first user identifier (ID) of the customer associated with the first merchant and a second user ID of the customer associated with the second merchant;
   after receipt of the first user ID and the second user ID, allocate an enrollment identifier to the customer based on the first user ID and the second user ID, the enrollment identifier being distinct from, the first user ID and the second user ID, the enrollment identifier being used to identify the customer during online purchase of products from the first merchant and the second merchant;
   receive, from the first online retail platform, a first message including first product information of a first product for which a first pay button was selected by the customer, and receive, from the second online retail platform, a second message including second product information of a second product for which a second pay button was selected by the customer;
   responsive to the selection of the first pay button and the second pay button, receive additional data that includes the first user ID and the second user ID;
   based on receiving the first user ID and the second user ID, retrieve the enrollment identifier;
   based on the retrieved enrollment identifier, initiate a single transaction that corresponds to purchase of the first product and the second product by the customer, and cause payment to be made to the first merchant and the second merchant corresponding to the single transaction; and
   responsive to the single transaction, and the payment made to the first merchant and the second merchant via the single transaction, send to the first merchant a first product release message, and send to the second merchant a second product release message.

2. The system as claimed in claim 1, wherein:
   functions of the first online retail platform are exposed via a first application programming interface (API);
   functions of the second online retail platform are exposed via a second API; and
   functions of the payment processor are exposed via a payment API, such that the first message and the second message can be received at the payment processor from the respective online retail platforms in real-time after each respective pay button is selected.

3. The system as claimed in claim 2, wherein the at least one payment processor is further configured to:
   cause payments to be made to the first merchant and the second merchant corresponding to the single transaction that is made by the customer prior to the first product release message being sent to the first merchant and prior to the second product release message being sent to the second merchant.

4. The system as claimed in claim 3, wherein:
   the first online retail platform is configured to send a first API request to the payment processor, the first API request comprising a purchase request indication of the first product;
   the second online retail platform is configured to send a second API request to the payment processor, the second API request comprising a second purchase request indication of the second product; and
   the payment processor is configured to send an API response to the respective online retail platforms, the API response comprising the first and the second product release messages.

5. The system as claimed in claim 3, wherein the first product information comprises an identifier and a price of the first product, and the second product information comprises an identifier and a price of the second product, and wherein transaction data of the single transaction comprises a total of the price of the first and the second products.

6. The system as claimed in claim 1, wherein the payment processor is further configured to:
   receive customer registration data comprising:
      first customer credentials associated with a customer account with the first merchant; and
      second customer credentials associated with a customer account with the second merchant; and
   enroll the first and the second customer credentials in association with a unique identifier of the customer.

7. The system as claimed in claim 6, wherein the payment processor is further configured to:
   receive additional data comprising:
      the first customer credentials; and
      the second customer credentials, wherein the additional data is received in real-time after each respective pay button is selected by the customer; and
   authenticate the additional data based on the enrolled first and the second customer credentials, wherein the single transaction corresponding to the purchase of the first and the second products is initiated after a successful authentication.

8. The system as claimed in claim 1, wherein the first product is added to a first virtual cart associated with the first merchant and the second product is added to a second virtual cart associated with the second merchant, and the user computing device is configured to display the first virtual cart and the second virtual cart on a user interface on the user computing device.

9. A computer-implemented method for facilitating purchase of products from a plurality of different merchants, the method comprising:
   receiving, by a payment processor, communications from a first online retail platform associated with a first merchant and from a second online retail platform associated with a second merchant;
   receiving, from a user computing device of a customer, by the payment processor, a first user identifier (ID) of aallthe customer associated with the first merchant and a second user ID of the customer associated with the second merchant;
   after receipt of the first user ID and the second user ID, allocating, by the payment processor, an enrollment identifier to the customer based on the first user ID and the second user ID, distinct from, the first user ID and the second user ID, the enrollment identifier being used to identify the customer during online purchase of products from the first merchant and the second merchant;
   receiving, by the payment processor, from the first online retail platform, a first message including first product information of a first product for which a first pay button was selected by the customer, and receiving, by the payment processor from a second online retail platform, a second message including second product information of a second product for which a second pay button was selected by the customer;
   responsive to the selection of the first pay button and the second pay button, receiving, by the payment processor, additional data that includes the first user ID and the second user ID;
   based on receiving the first user ID and the second user ID, retrieving, by the payment processor, the enrollment identifier;
   based on the retrieved enrollment identifier, initiating, by the payment processor, a single transaction that corresponds to purchase of the first product and the second product by the customer and causing payment to be made to the first merchant and the second merchant corresponding to the single transaction; and
   responsive to the single transaction and the payment made to the first merchant and the second merchant via the single transaction, sending, by the payment processor, to the first merchant a first product release message, and sending to the second merchant a second product release message.

10. The method as claimed in claim 9, further comprising:
   exposing functions of the first online retail platform via a first application programming interface (API);
   exposing functions of the second online retail platform via a second API; and
   exposing functions of the payment processor via a payment API, such that the first message and the second message can be received at the payment processor from the respective online retail platforms in real-time after each respective pay button is selected.

11. The method as claimed in claim 10, further comprising:
   causing payments to be made to the first merchant and the second merchant corresponding to the single transaction that is made by the customer, prior to sending the first product release message to the first merchant and prior to sending the second product release message to the second merchant.

12. The method as claimed in claim 11, further comprising:
   sending a first API request from the first online retail platform to the payment processor, wherein the first API request comprises a purchase request indication of the first product;
   sending a second API request from the second online retail platform to the payment processor, wherein the second API request comprises a second purchase request indication of the second product; and
   subsequently sending an API response from the payment processor to the respective online retail platforms, wherein the API response comprises the first and the second product release messages.

13. The method as claimed in claim 11, wherein the first product information comprises an identifier and a price of the first product, and the second product information comprises an identifier and a price of the second product, and wherein transaction data of the single transaction comprises a total of the price of the first and the second products.

14. The method as claimed in claim 9, further comprising, receiving, at the payment processor, customer registration data comprising:
   the first user ID; and
   the second user ID; and
   enrolling, at the payment processor, the first user ID and the second user ID in association with a unique identifier of the customer.

15. The method as claimed in claim 9, wherein the first product is added to a first virtual cart associated with the first merchant and the second product is added to a second virtual cart associated with the second merchant, and the user computing device is configured to display the first virtual cart and the second virtual cart on a user interface on the user computing device.

16. The method as claimed in claim 15, wherein the single transaction is made using a digital wallet application.

17. A non-transitory computer readable medium storing program instructions for facilitating purchase of products from a plurality of different merchants, which, when executed by a processor, cause the processor to at least perform operations comprising:

receiving, by a payment processor, communications from a first online retail platform associated with a first merchant and from a second online retail platform associated with a second merchant;

receiving, from a user computing device of a customer, by the payment processor, a first user identifier (ID) of the customer associated with the first merchant and a second user ID of the customer associated with the second merchant;

after receipt of the first user ID and the second user ID, allocating, by the payment processor, an enrollment identifier to the customer based on the first user ID and the second user ID, the enrollment identifier being distinct from the first user ID and the second user ID, the enrollment identifier being used to identify the customer during online purchase of products from the first merchant and the second merchant;

receiving, by the payment processor, from the first online retail platform, a first message including first product information of a first product for which a first pay button was selected by the customer and receiving, by the payment processor from a second online retail platform a second message including second product information of a second product for which a second pay button was selected by the customer;

responsive to the selection of the first pay button and the second pay button, receiving, by the payment processor, additional data that includes the first user ID and the second user ID;

based on receiving the first user ID and the second user ID, retrieving, by the payment processor, the enrollment identifier;

based on the retrieved enrollment identifier, initiating, by the payment processor, a single transaction that corresponds to purchase of the first product and the second product by the customer and causing payment to be made to the first merchant and the second merchant corresponding to the single transaction; and responsive to the single transaction and the payment made to the first merchant and the second merchant via the single transaction, sending to the first merchant a first product release message, and sending to the second merchant a second product release message.

18. The non-transitory computer readable medium as claimed in claim 17, wherein the program instructions further cause the processor to perform operations comprising:

exposing functions of the first online retail platform via a first application programming interface (API);

exposing functions of the second online retail platform via a second API; and exposing functions of the payment processor via a payment API, such that the first message and the second message can be transmitted to the payment processor from the respective online retail platforms in real-time after each respective pay button is selected.

19. The non-transitory computer readable medium as claimed in claim 18, wherein the program instructions further cause the processor to perform operations comprising:

receiving a first API request from the first online retail platform at the payment processor, wherein the first API request comprises a purchase request indication of the first product;

receiving a second API request from the second online retail platform at the payment processor, wherein the second API request comprises a second purchase request indication of the second product; and subsequently sending, from the payment processor, an API response to the respective online retail platforms, wherein a first API response comprises the first product release message and a second API response comprises the second product release message.

20. The non-transitory computer readable medium as claimed in claim 19, wherein the first product is added to a first virtual cart associated with the first merchant and the second product is added to a second virtual cart associated with the second merchant, and the user computing device is configured to display the first virtual cart and the second virtual cart on a user interface on the user computing device.

* * * * *